US009481461B1

(12) United States Patent
Laughlin

(10) Patent No.: US 9,481,461 B1
(45) Date of Patent: Nov. 1, 2016

(54) DUAL RELEASE LANYARD CONNECTOR

(71) Applicant: Cooper Technologies Company, Houston, TX (US)

(72) Inventor: Patrick John Laughlin, Thousand Oaks, CA (US)

(73) Assignee: Cooper Technologies Company, Houston, TX (US)

(*) Notice: Subject to any disclaimer, the term of this patent is extended or adjusted under 35 U.S.C. 154(b) by 0 days.

(21) Appl. No.: 14/926,083

(22) Filed: Oct. 29, 2015

(51) Int. Cl.
H01R 13/73 (2006.01)
B64D 1/04 (2006.01)
F16G 11/10 (2006.01)

(52) U.S. Cl.
CPC .................. B64D 1/04 (2013.01); F16G 11/10 (2013.01)

(58) Field of Classification Search
CPC .................................. B64D 1/04; F16G 11/10
USPC ........................... 89/1.58; 439/271, 272, 258
See application file for complete search history.

(56) References Cited

U.S. PATENT DOCUMENTS

| 3,509,515 | A | * | 4/1970 | Acord | F41F 3/055 285/316 |
| 3,609,632 | A | * | 9/1971 | Vetter | H01R 13/623 439/258 |
| 3,953,098 | A | * | 4/1976 | Avery | H01R 13/635 439/258 |
| 4,421,373 | A | * | 12/1983 | Ratchford | H01R 13/5219 439/152 |
| 4,433,889 | A | * | 2/1984 | Ratchford | H01R 13/748 439/258 |
| 4,447,103 | A | * | 5/1984 | Werth | H01R 13/5219 439/152 |
| 4,605,271 | A | * | 8/1986 | Burns | H01R 13/6276 439/160 |
| 5,017,150 | A | * | 5/1991 | Moody | H01R 13/523 439/197 |
| 6,872,889 | B1 | * | 3/2005 | Cruttenden | B67D 7/3218 174/69 |
| 8,052,444 | B1 | * | 11/2011 | McMahon | F41F 3/055 439/258 |
| 8,187,014 | B2 | * | 5/2012 | Laughlin | H01R 13/633 439/180 |
| 2010/0015833 | A1 | * | 1/2010 | Laughlin | H01R 13/502 439/271 |
| 2010/0230572 | A1 | * | 9/2010 | Laughlin | F16G 11/04 248/328 |
| 2010/0294117 | A1 | * | 11/2010 | Laughlin | H01R 13/633 89/1.58 |

FOREIGN PATENT DOCUMENTS

EP 369872 A2 5/1990
GB 2165402 A 4/1986

* cited by examiner

Primary Examiner — Samir Abdosh
(74) Attorney, Agent, or Firm — Ziolkowski Patent Solutions Group, SC

(57) ABSTRACT

A dual release lanyard connector includes first and second lanyard rings coupleable to first and second lanyard cables, a coupling sleeve coupled to the first lanyard ring and movable between a first position and a second position, and a locking ring configured to engage the coupling sleeve and movable between the first position and the second position, the locking ring having a first ring groove. A two-piece housing of the lanyard connector includes a plug housing with first and second plug housing grooves and a secondary housing coupled to the second lanyard ring and having a secondary housing groove, the secondary housing movable between a third position and a fourth position. The secondary housing is configured to engage the coupling sleeve such that movement of the secondary housing to the fourth position causes a corresponding movement of the coupling sleeve and locking ring to the second position.

20 Claims, 13 Drawing Sheets

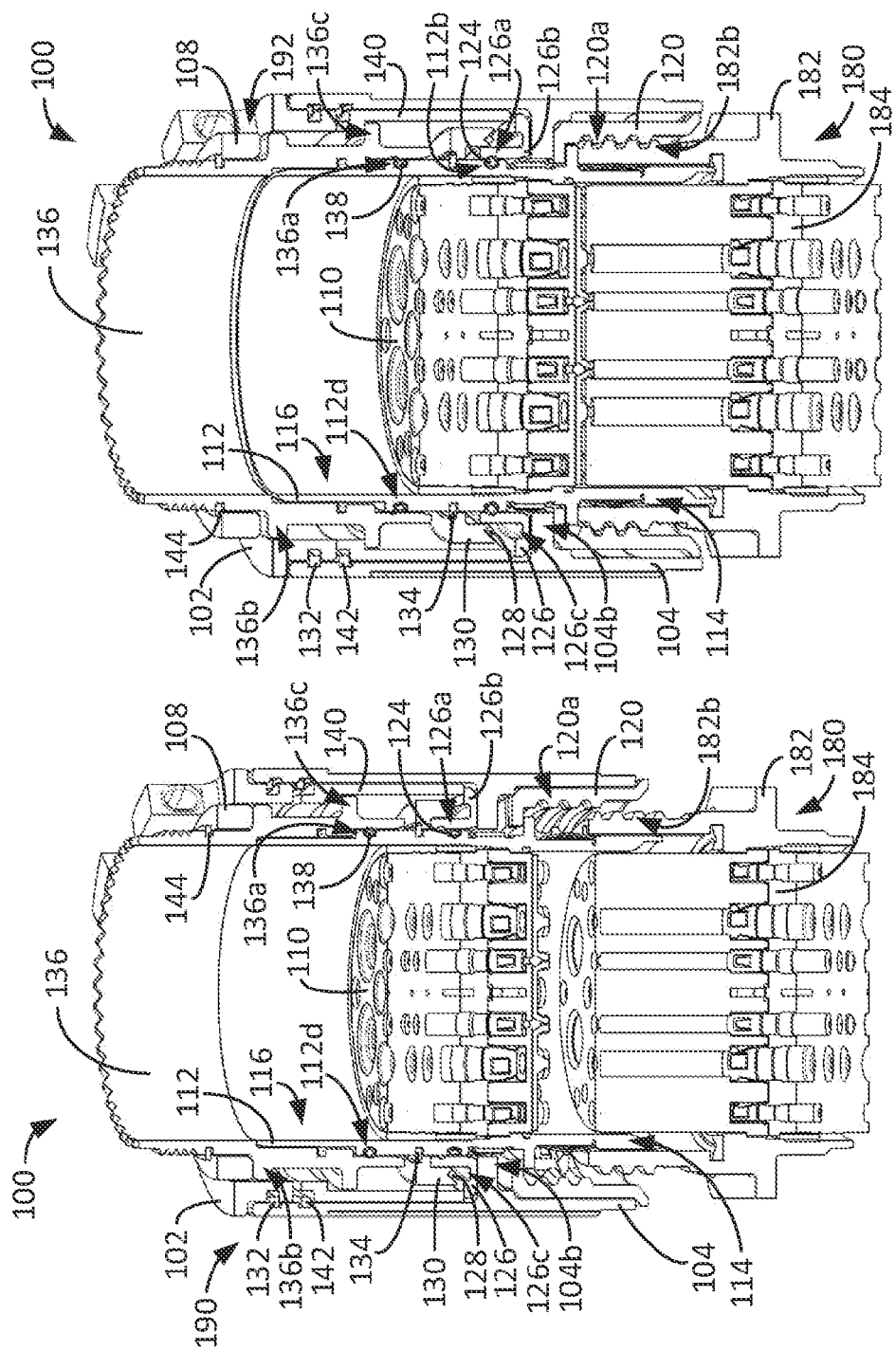

DUAL RELEASE LANYARD CONNECTOR

BACKGROUND OF THE INVENTION

The present invention relates generally to lanyard connectors. More particularly, the present invention is directed to a dual release umbilical connector for releasing an ordinance from an aircraft.

An aircraft carrying an ordinance, such as a weapon, typically utilizes an umbilical connector and a single loop contiguous lanyard for release of the ordinance. The connector interfaces between the ordinance and a lanyard cable, and the lanyard cable is looped around an aircraft mounted post, also known as a "bail bar."

The ordinance mounts to the connector using a receptacle on the ordinance, and the ordinance is held in place by a coupling ring and a number of threaded segments. Conventional lanyard connectors utilize a single primary compression type spring that prevents the coupling ring from shifting and allowing release of the connector. Upon pulling the lanyard cable during aircraft ordinance release, the primary spring compresses. Compression of the primary spring allows the coupling ring to shift such that the threaded segments move outward. However, as the connector begins disconnecting from the ordinance receptacle, the primary spring acts to close the threaded segments and "ratcheting" may occur, whereby the threaded segments become caught on threading or the receptacle as the connector is being pulled free. As a result, the connector may be destroyed, which in turn may damage the umbilical cable, as well as the aircraft airframe. The cost of replacing damaged connectors and cables, as well as repairing damaged airframes is high.

Some umbilical connectors are configured as dual release connectors that provide redundant means for electrical release of the ordinance. In such connectors, if a failure occurs when pulling a primary lanyard cable, a secondary lanyard cable may be used to actuate the connector. However, it is recognized that existing dual release connectors utilize a primary spring—similar to the single release connector described above—and often utilize a common release path in the connector for the primary and secondary lanyard cables, which provides less than optimal functionality in the connector for releasing the ordinance.

Therefore, a need exists for a lanyard connector that can withstand aircraft ordinance release, without easily being damaged. A need further exists for such a lanyard connector to provide redundant separation capability (i.e., a dual release lanyard connector), with such a connector providing separate primary and secondary release paths and providing reset and multiple testing capabilities.

BRIEF DESCRIPTION OF THE INVENTION

In accordance with one aspect of the invention, a dual release lanyard connector coupleable to an ordinance receptacle includes a first lanyard ring coupleable to a first lanyard cable, a second lanyard ring coupleable to a second lanyard cable, a coupling sleeve coupled to the first lanyard ring and movable between a first position and a second position, and a locking ring configured to engage the coupling sleeve and movable between the first position and the second position, the locking ring having a first ring groove. The dual release lanyard connector also includes a two-piece housing comprising a plug housing having a first plug housing groove and a second plug housing groove and a secondary housing coupled to the second lanyard ring and having a secondary housing groove, the secondary housing movable between a third position and a fourth position. The dual release lanyard connector further includes a first latching spring that is partially disposed within the first ring groove and partially disposed within the first plug housing groove at the first position, and wherein the first latching spring disengages the first ring groove and is fully disposed within the first plug housing groove at the second position. The dual release lanyard connector still further includes a second latching spring that is partially disposed within the second plug housing groove and partially disposed within the secondary housing groove at the third position, and wherein the second latching spring disengages the secondary housing groove and is fully disposed within the second plug housing groove at the fourth position. The secondary housing is configured to engage the coupling sleeve such that movement of the secondary housing to the fourth position causes a corresponding movement of the coupling sleeve and locking ring to the second position.

In accordance with another aspect of the invention, a dual release lanyard connector coupleable to an ordinance receptacle includes a primary lanyard connector subassembly connectable to a first lanyard cable and movable between a first position and a second position to provide a first release path for releasing the ordinance receptacle from the dual release lanyard connector, with the dual release lanyard connector retaining the ordinance receptacle when the primary lanyard connector subassembly is in the first position and releasing the ordinance receptacle when the primary lanyard connector subassembly is in the second position. The dual release lanyard connector also includes a secondary lanyard connector subassembly connectable to a second lanyard cable and movable between a third position and a fourth position to provide a second release path for releasing the ordinance receptacle from the dual release lanyard connector, with the dual release lanyard connector retaining the ordinance receptacle when the secondary lanyard connector subassembly is in the third position and releasing the ordinance receptacle when the secondary lanyard connector subassembly is in the fourth position. The dual release lanyard connector further includes a reset spring configured to reset the primary lanyard connector subassembly from the second position to the first position and reset the secondary lanyard connector subassembly from the fourth position to the third position.

In accordance with yet another aspect of the invention, a method of releasing an ordinance receptacle coupled to a dual release lanyard connecter includes coupling the receptacle to the dual release lanyard connector, pulling on a first lanyard cable to actuate a primary lanyard connector subassembly from a first position to a second position so as to cause the receptacle to be released from the dual release lanyard connector, and, when a failure occurs preventing releasing of the receptacle from the dual release lanyard connector upon pulling on the first lanyard cable, then pulling on a second lanyard cable to actuate a secondary lanyard connector subassembly from a third position to a fourth position, so as to cause the receptacle to be released from the dual release lanyard connector. The method also includes resetting the primary lanyard connector subassembly from the second position to the first position and the secondary lanyard connector subassembly from the third position to the fourth position. Actuating the primary lanyard connector subassembly includes actuating a first lanyard ring of the dual release lanyard connector from the first position to the second position, with actuation of the first lanyard ring causing a coupling sleeve and a locking ring of the dual release lanyard connector to also move from the first position to the second position, such that a first latching spring of the dual release lanyard connector disengages a first ring groove of the locking ring and a reset spring of the dual release lanyard connector is compressed. Actuating the secondary lanyard connector subassembly includes actuating a second lanyard ring of the dual release lanyard connector from the third position to the fourth position, with actuation of the second lanyard ring causing a secondary housing of the dual release lanyard connector to also move from the third position to the fourth position such that a second latching spring of the dual release lanyard connector disengages a groove of the secondary housing, with movement of the secondary housing to the fourth position causing the coupling sleeve and the locking ring to move from the first position to the second position and the reset spring to be compressed.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings:

FIGS. 12C-E are side cross-sectional views of the lanyard connector and ordinance receptacle shown in FIG. 12A, in a first actuated position, a released position, and a cleared position, respectively, achieved via a primary release path, according to an exemplary embodiment.

FIG. 12F-12H are side cross-sectional views of the lanyard connector and ordinance receptacle shown in FIG. 12A, in a second actuated position, a released position, and a cleared position, respectively, achieved via a secondary release path, according to an exemplary embodiment.

DETAILED DESCRIPTION OF THE INVENTION

Figure 1A:
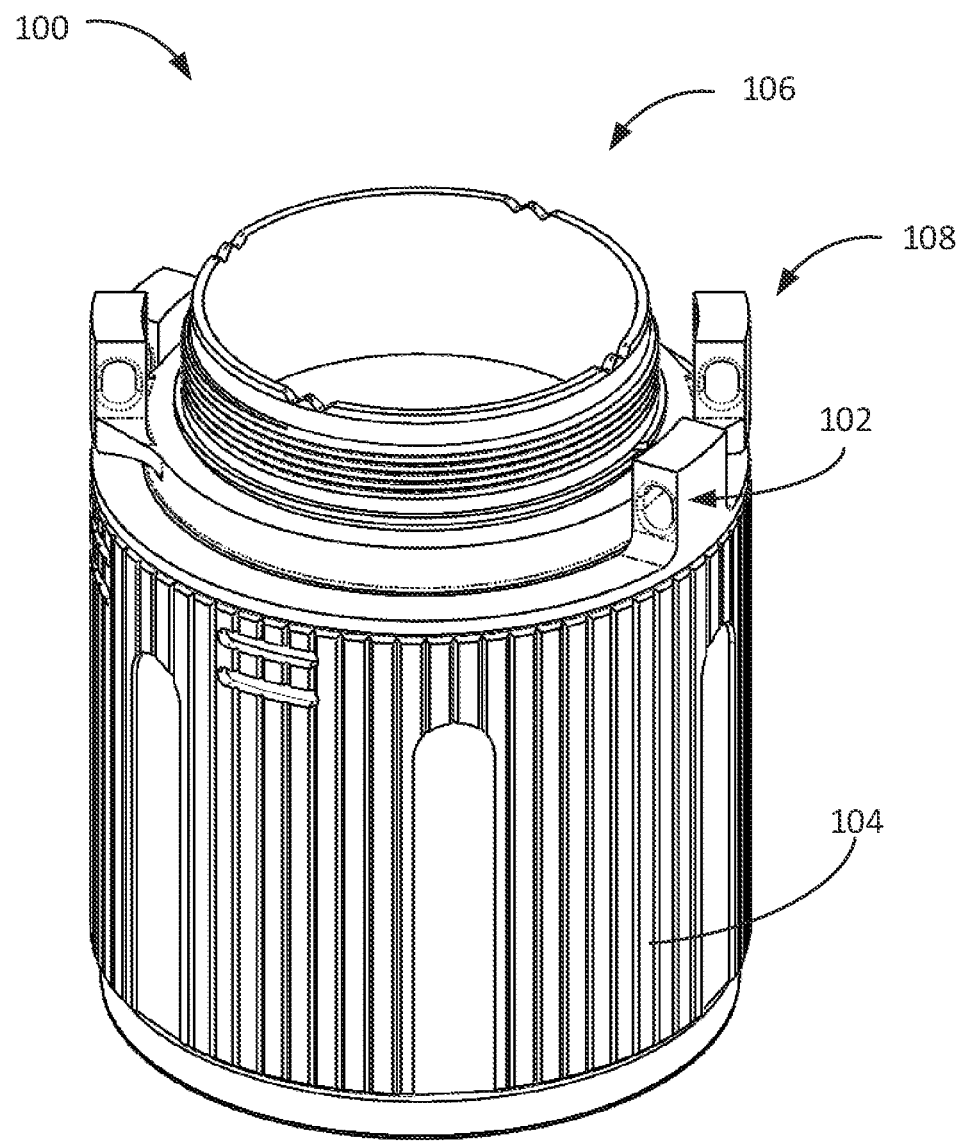
FIG. 1A is a top perspective view of a lanyard connector, according to an exemplary embodiment.

Embodiments of the present invention are directed to a dual release lanyard connector that provides redundant separation capability via separate primary and secondary release paths. The dual release lanyard connector also provides reset and multiple testing capabilities. The dual release lanyard connector interfaces between a lanyard cable and an ordinance to be released from an aircraft and is generally capable of handling the forces associated with the release of the ordinance. Generally, the dual release lanyard connector has more longevity than existing lanyard connectors in the market.

The invention may be better understood by reading the following description of non-limitative, exemplary embodiments with reference to the attached drawings wherein like parts of each of the figures are identified by the same reference characters.

Figure 1B:
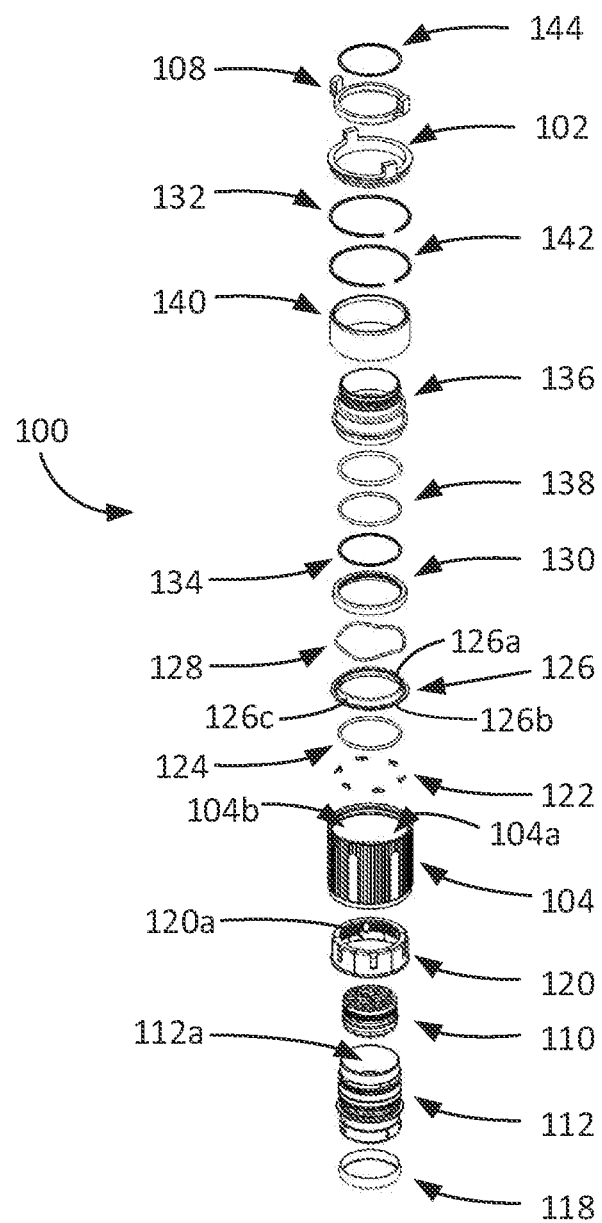
FIG. 1B is an exploded view of the lanyard connector shown in FIG. 1A, according to an exemplary embodiment.
Figure 1C:
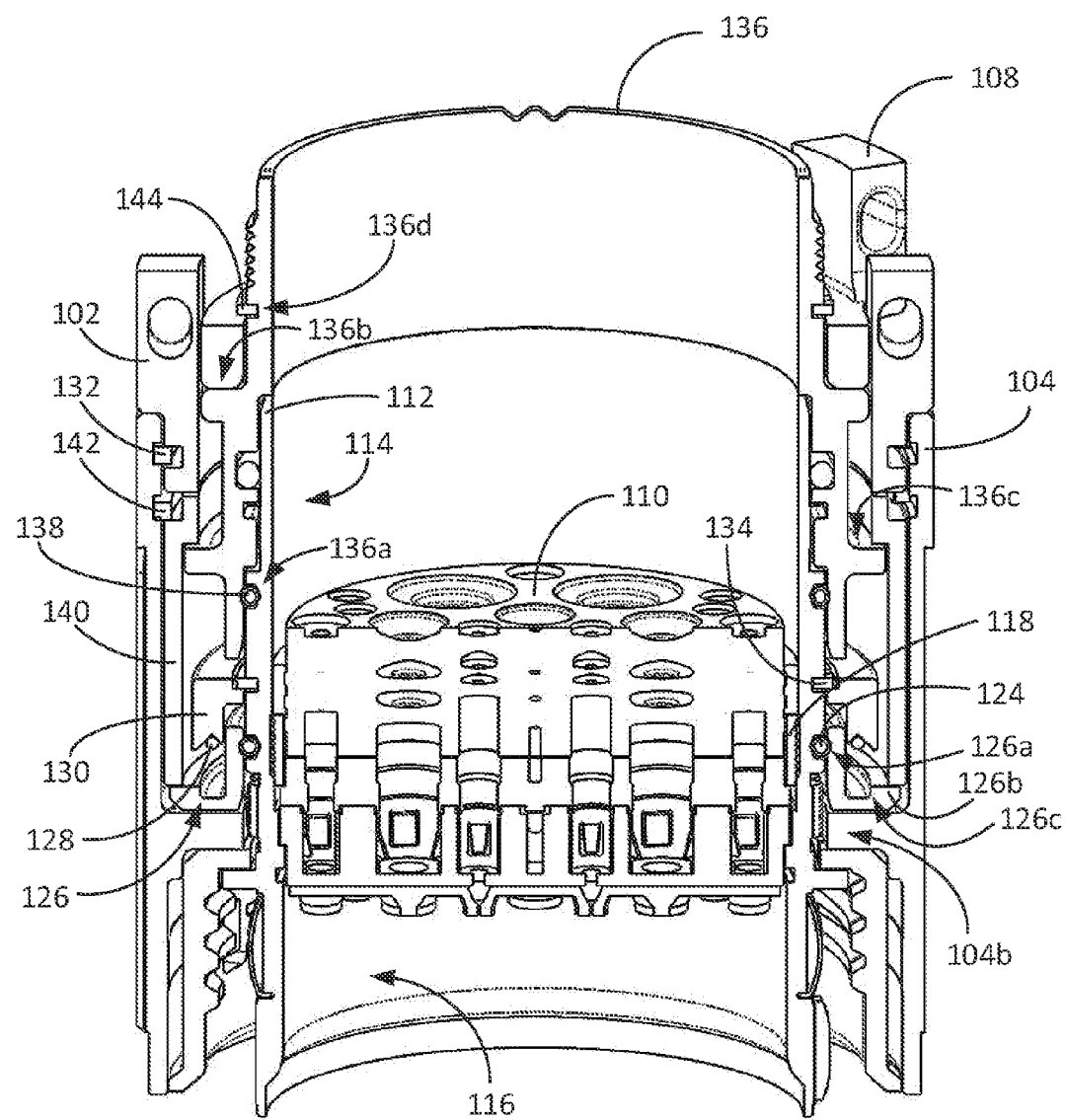
FIG. 1C is a side cross-sectional view of the lanyard connector shown in FIG. 1A, according to an exemplary embodiment.

FIGS. 1A-1C illustrate top perspective, exploded, and side cross-sectional views of a dual release lanyard connector 100, according to an exemplary embodiment. Referring first to FIG. 1A, components of the dual release lanyard connector 100 visible from an exterior are shown, including a circular first lanyard ring 102 that is configured to receive a first lanyard cable (not shown) therein. The first lanyard ring 102 is coupled to a cylindrical coupling sleeve 104 that forms a first cavity. A two-piece, articulated housing 106 is positioned in the first cavity and provides for insertion of an ordinance receptacle (not shown) therein. A circular second lanyard ring 108 is coupled to the housing 106 and is configured to receive a second lanyard cable (not shown) therein.

FIG. 1B is an exploded view showing all of the components of the dual release lanyard connector 100, and FIG. 1C is a side cross-sectional view of the assembled dual release lanyard connector 100, according to an exemplary embodiment. The dual release lanyard connector 100 includes a plug insert assembly 110 positioned within a cavity 112a of a plug housing 112 that is part of the two-piece housing 106—with the plug housing 112 generally being characterized as having a first portion 114 that receives the plug insert assembly 110 and a second portion 116 that extends out from the first portion 114. The plug insert assembly 110 is held in place by an insert retainer 118. The insert retainer 118 is a press-fit plastic ring that can be glued in place. In alternative embodiments, the insert assembly 110 can be held in place by an aluminum-threaded ring. One having ordinary skill in the art will recognize that the insert retainer 118 can be fabricated from any material so long as the insert retainer 118 is able to withstand the forces exposed to the system without detaching the plug insert assembly 110 from the plug housing 112.

The connector 100 includes six threaded segments 120 that surround the first portion 114 of the plug housing 112 and an ordinance receptacle (not shown) coupled to the plug insert assembly 120. The threaded segments 120 include threads 120a for mating with corresponding threads (not shown) on the ordinance receptacle. Upon radial separation of the six threaded segments 120, the threads 120a disengage with the corresponding threads on the ordinance receptacle and allow disconnection of the ordinance receptacle from the plug insert assembly 120, thereby releasing the ordinance.

The coupling sleeve 104 surrounds the plug housing 112 and the threaded segments 120. The connector 100 also includes six anti-rotation springs (or ratchet springs) 122. The ratchet springs 122 are positioned within grooves 104a of the coupling sleeve 104, and interface with an outer surface of the plug housing 112. The ratchet springs 122 prevent the coupling sleeve 104 from rotating and unthreading itself from an ordinance receptacle (not shown).

The connector 100 includes a first circular canted coil latching spring 124. The first latching spring 124 is disposed at least partially within a groove 112b (i.e., "first plug housing groove") on the plug housing 112. The first latching spring 124 also interfaces with a groove 126a on a circular locking ring 126. The locking ring 126 includes a flange 126b in contact with the first lanyard ring 102 and a protrusion 104b extending from the interior of the coupling sleeve 104.

The connector 100 also includes a reset spring 128 (e.g., a sinusoidal spring) and a rear connector cover 130, with the rear connector cover 130 being positioned between the first lanyard ring 102 and the plug housing 112 and with the reset spring 128 being positioned below the rear connector cover 130 and between the first lanyard ring 102 and the locking ring 126. At least a portion of the reset spring 128 rests within a groove 126c on the locking ring 126, with the rear connector cover 130 holding the reset spring 128 in place.

The connector 100 further includes a circular first lanyard ring retainer 132. The first lanyard ring retainer 132 holds the first lanyard ring 102 to the coupling sleeve 104 and allows the first lanyard ring 102 to rotate about the coupling sleeve 104. In certain alternative embodiments, the first lanyard ring retainer 132 is a sinusoidal spring or includes multiple coils that overlap. One having ordinary skill in the art will recognize that a number of lanyard ring retainers exist.

The connector 100 also includes a circular rear connector cover retainer 134. The rear connector cover retainer 134 is positioned around the plug housing 112 and above the rear connector cover 130. The rear connector cover retainer 134 forces the rear connector cover 130 towards the reset spring 128, which ultimately holds the connector 100 together.

As further shown in FIGS. 1B and 1C, the connector 100 also includes a secondary housing 136 that forms part of the two-piece articulated housing 106. The secondary housing 136 is positioned within coupling sleeve 104 in a manner such that a rear end of the secondary housing 136 extends out from the coupling sleeve 104. The secondary housing 136 is positioned about the second portion 116 of plug housing 112, with the secondary housing 136 thus being contained/positioned between the second portion 116 of plug housing 112 and coupling sleeve 104.

The connector 100 includes a second circular canted coil latching spring 138. The second latching spring 138 interfaces with a groove 136a on the secondary housing 136. The second latching spring 138 also is disposed at least partially within a groove 112b (i.e., "second plug housing groove") on the plug housing 112. The secondary housing 136 includes a flange 136b in contact with the second lanyard ring 108.

An intermediate sleeve 140 of connector 100 is positioned between the coupling sleeve 104 and the secondary housing 136 to provide for engagement therebetween, with a flange or ledge 136c of the secondary housing 136 being configured to engage the intermediate sleeve 140 so as to cause the intermediate sleeve 140 to engage the coupling sleeve 104—such that movement of the secondary housing 136 causes a corresponding movement of the coupling sleeve 104. A retainer ring 142 is provided in connector 100 that couples the intermediate sleeve 140 to the coupling sleeve 104 and allows the coupling sleeve 104 to rotate about the intermediate sleeve 140. In certain alternative embodiments, the retainer ring 142 is a sinusoidal spring or includes multiple coils that overlap. One having ordinary skill in the art will recognize that a number of lanyard ring retainers exist.

The connector 100 further includes a circular second lanyard ring retainer 144. The second lanyard ring retainer 144 holds the second lanyard ring 108 to the secondary housing 136 and allows the second lanyard ring 108 to rotate about the secondary housing 136. In certain alternative embodiments, the second lanyard ring retainer 144 is a sinusoidal spring or includes multiple coils that overlap. One having ordinary skill in the art will recognize that a number of lanyard ring retainers exist.

Figure 2A:
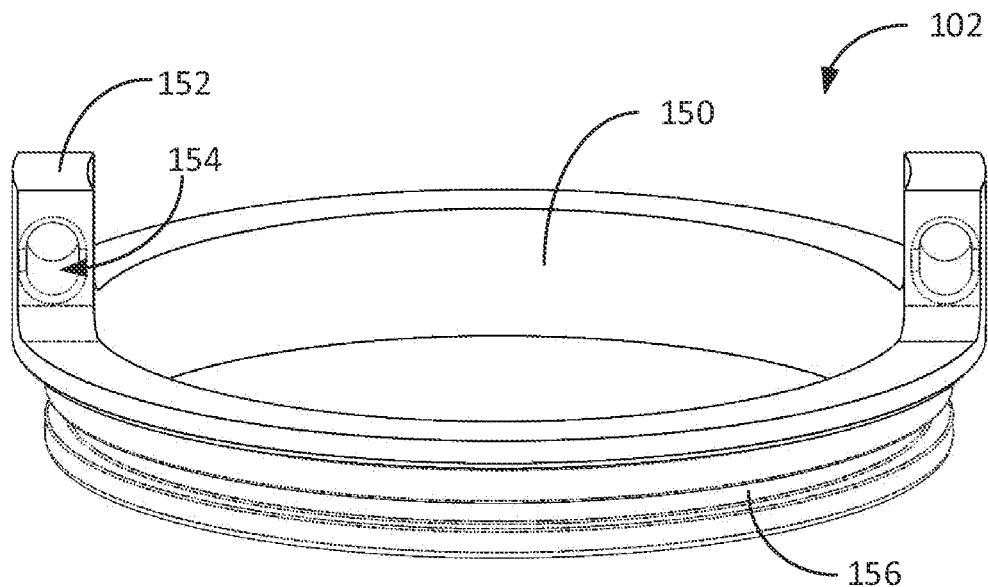
FIG. 2A is a top perspective view of a first lanyard ring, according to an exemplary embodiment.
Figure 2B:
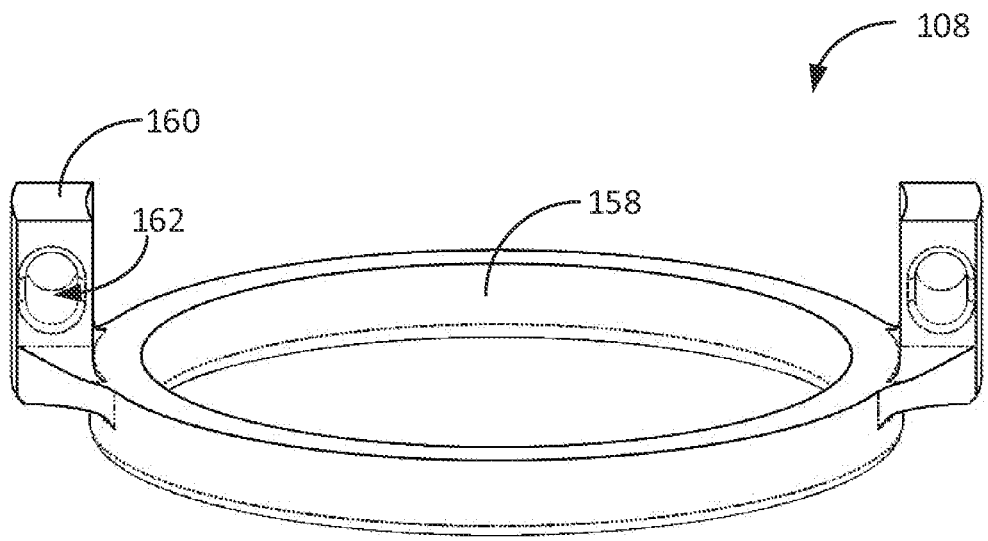
FIG. 2B is a top perspective view of a second lanyard ring, according to an exemplary embodiment.

Referring now to FIGS. 2A and 2B, top perspective views of the first and second circular lanyard rings 102, 108 are shown, respectively, according to an exemplary embodiment. As shown in FIG. 2A, the first lanyard ring 102 includes a base 150 from which two protrusions 152 extend orthogonally. The protrusions 152 are positioned opposite from each other. Each protrusion 152 includes an opening 154 configured to receive a means for connecting to a lanyard cable (not shown). The first lanyard ring 102 also includes a groove 156 configured to receive a first lanyard ring retainer 132 (FIGS. 1B and 1C).

As shown in FIG. 2B, the second lanyard ring 108 includes a base 158 from which two protrusions 160 extend orthogonally. The protrusions 160 are positioned opposite from each other. Each protrusion 160 includes an opening 162 configured to receive a means for connecting to a lanyard cable (not shown), with the protrusions 160 being constructed such that the openings 162 are located radially outward from a circumference of base 158—with it being recognized that a circumference of base 158 is less than that of base 150 of first lanyard ring 102, such that second lanyard ring 108 can be positioned inside of first lanyard ring 102.

Figure 3:
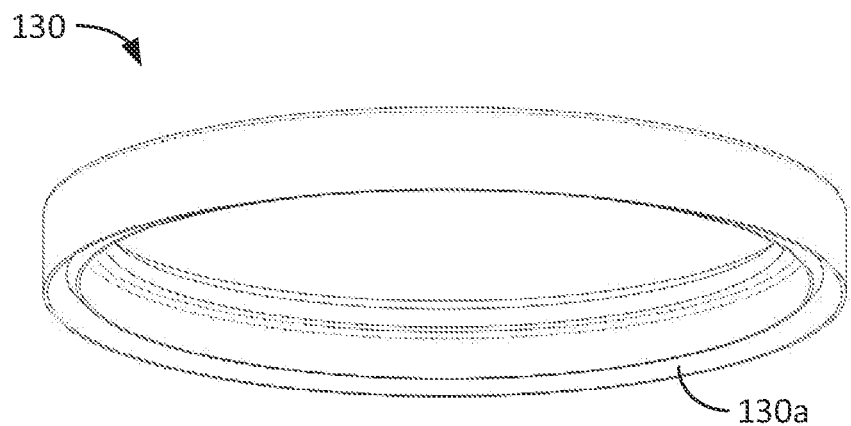
FIG. 3 is a bottom perspective view of a rear connector cover, according to an exemplary embodiment.
Figure 4:
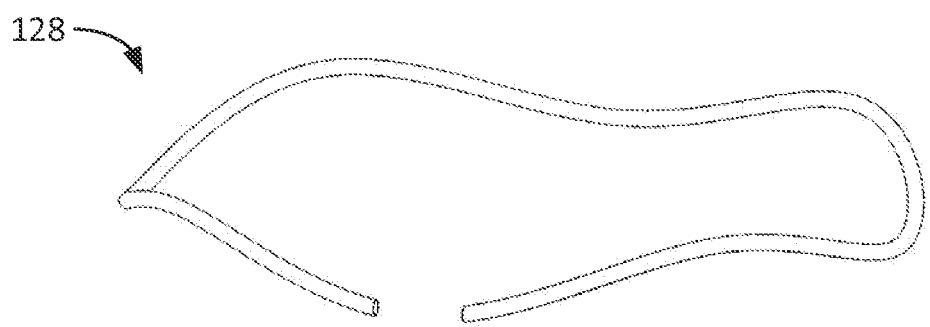
FIG. 4 is a top perspective view of a reset spring, according to an exemplary embodiment.
Figure 5:
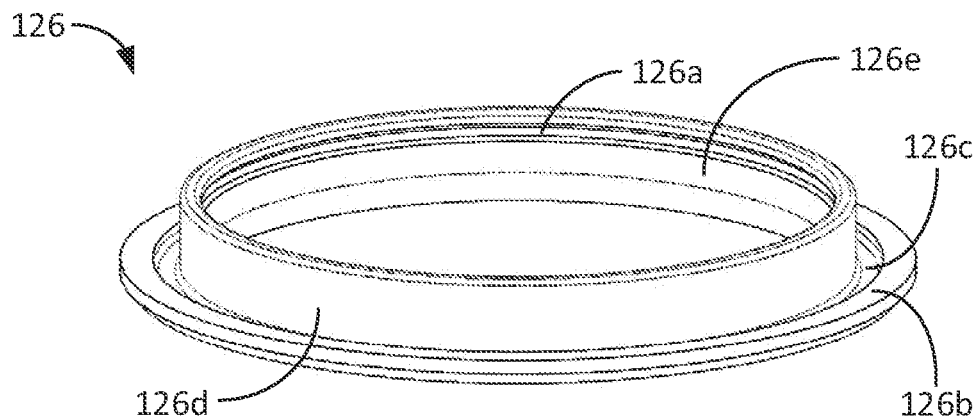
FIG. 5 is a top perspective view of a locking ring, according to an exemplary embodiment.

FIG. 3 is a bottom perspective view of the connector cover 130, according to an exemplary embodiment. The connector cover 130 is circular and includes a groove 130a. The groove 130a is configured to at least partially receive the reset spring 128, shown in FIG. 4. The reset spring 128 functions to separate the connector cover 130 (FIG. 3) from the locking ring 126 (FIG. 5). The reset spring 128 may be a compression type spring or a sinusoidal type spring. In certain embodiments, the reset spring 128 is a bumper spring fabricated from a compressible rubber.

Figure 6:
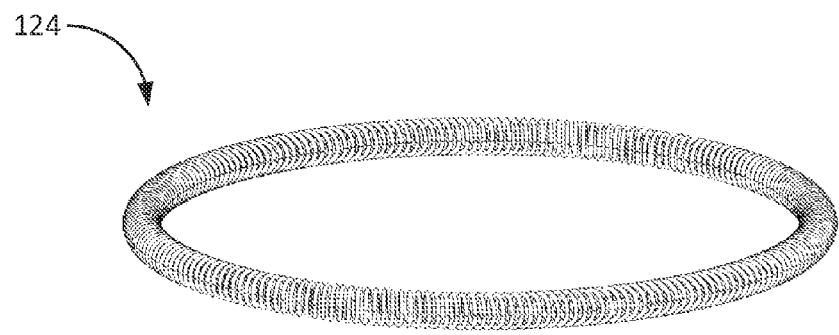
FIG. 6 is a perspective view of a latching spring, according to an exemplary embodiment.

FIG. 5 is a top perspective view of the locking ring 126, according to an exemplary embodiment. The locking ring 126 includes a circular base 126d from which the flange 126b extends. The flange 126b includes groove 126c configured to receive at least a portion of the reset spring 128 (FIG. 400). The locking ring 126 also includes the polygonal groove 126a adjacent to a generally smooth circular wall 126e. The groove 126a is configured to at least partially engage the first latching spring 124, shown in FIG. 6. In some embodiments, the first latching spring 124 may be a canted coil type spring. It is also recognized that FIG. 6 is illustrative of the second latching spring 138, which is identical to construction of the first latching spring 124, except that the second latching spring 138 may be plated/coated with gold or another electrically conductive material.

Figure 7:
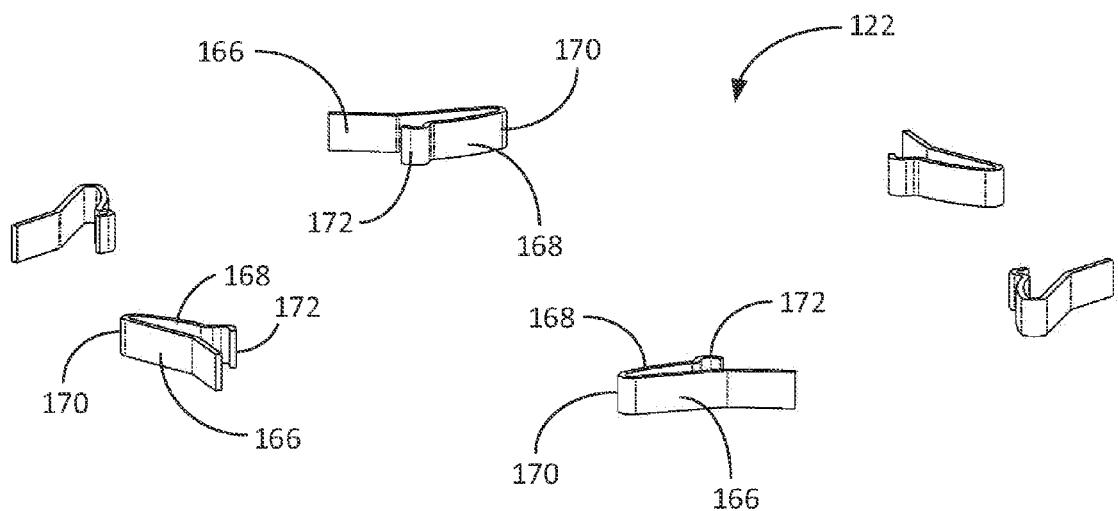
FIG. 7 is a perspective view of anti-rotation springs, according to an exemplary embodiment.

FIG. 7 is a perspective view of the six anti-rotation springs 122, according to an exemplary embodiment. Each anti-rotation spring 122 includes a first portion 166 connected to a second portion 168 by a resilient bend 170. The second portion 168 includes a radial bend 172 that engage a portion of a plug housing (not shown). The anti-rotation springs 122 can function to minimize or eliminate unwanted unthreading of the coupling sleeve 104, described with respect to FIG. 8 below, from an ordinance receptacle (not shown). In certain alternative embodiments, springs and ball bearings, bent flat springs, or a single molded ring having spring arms may be used to prevent rotation of the coupling sleeve 104. One having ordinary skill in the art will recognize that a number of devices can be used in place of the anti-rotation springs 122 as long as the devices prevent the coupling sleeve 104 from unthreading from the ordinance receptacle during vibration.

Figure 8:
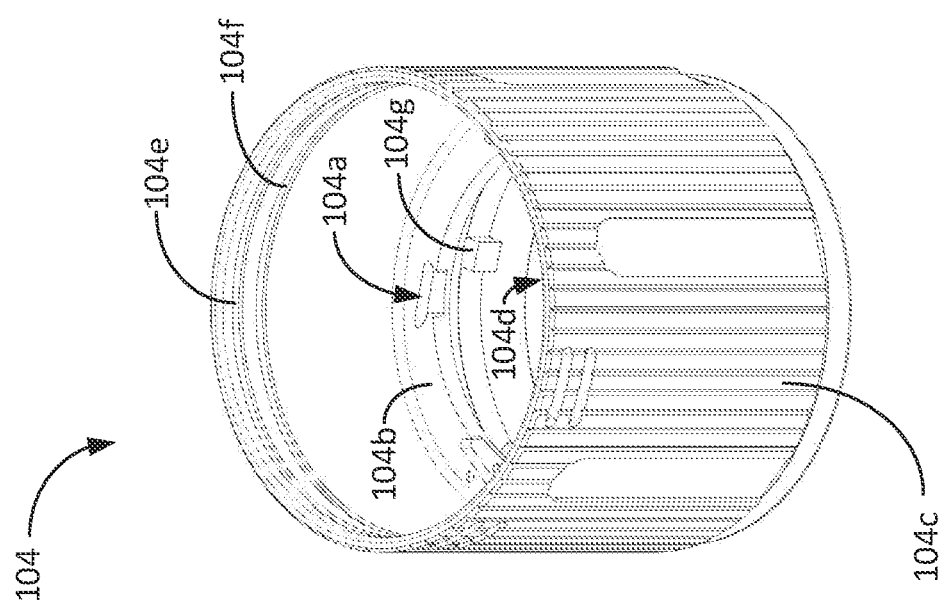
FIG. 8 is a top perspective view of a coupling ring, according to an exemplary embodiment.

FIG. 8 is a top perspective view of the coupling sleeve 104, according to an exemplary embodiment. The coupling sleeve 104 includes a cylindrical base wall 104*c* having a cavity 104*d* therein. The coupling sleeve 104 includes a ledge or protrusion 104*b* extending orthogonally inward from the base wall 104*c*. The protrusion 104*b* includes six notches 104*a* spaced equally apart on the protrusion 104*b*. The notches 104*a* are configured to receive anti-rotation springs 122 (FIG. 7). One having ordinary skill in the art will recognize that any number of notches 104*a* and corresponding anti-rotation springs 122 may be included in alternative embodiments of the invention. One having ordinary skill in the art will also recognize that the anti-rotation springs 122 may vary in configuration, and notches 820 can be configured to receive the corresponding anti-rotation springs 122.

The coupling sleeve 104 also includes a pair of grooves 104*e*, 104*f* in the interior of the base wall 104*c*. The groove 104*e* is configured to at least partially receive the first lanyard ring retainer 132 (FIGS. 1B and 1C) that secures coupling sleeve 104 to first lanyard ring 102. The groove 104*f* is configured to at least partially receive the retainer ring 142 (FIGS. 1B and 1C) that secures coupling sleeve 104 to intermediate sleeve 140. The coupling sleeve 104 further includes six square-shaped protrusions 104*g* spaced equally apart below the protrusion 104*b* on the interior of the base wall 104*c*. The protrusions 104*g* engage six threaded segments 120, shown in FIG. 9.

Figure 9:
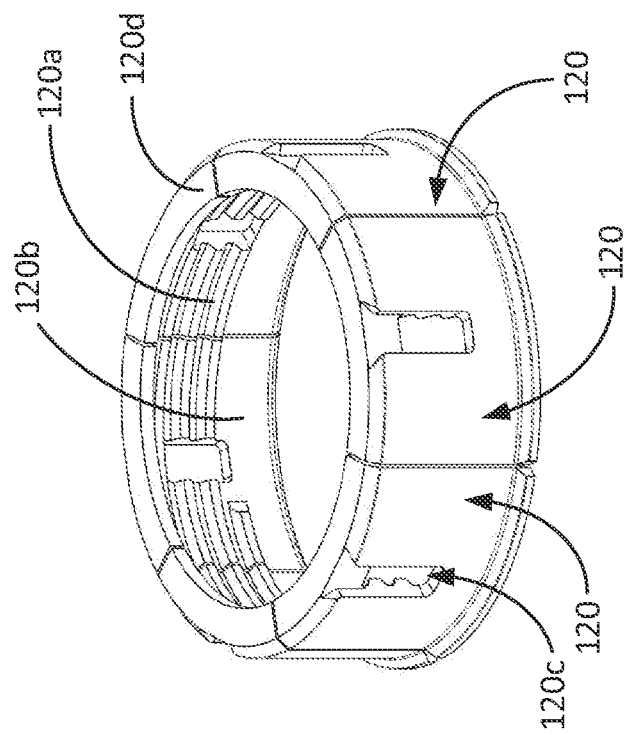
FIG. 9 is a top perspective view of threaded segments, according to an exemplary embodiment.

FIG. 9 is a top perspective view of six separate threaded segments 120, according to an exemplary embodiment. When placed adjacent to one another, the threaded segments 120 form a cylinder having a cavity 120*b* therein. Each threaded segment 120 includes a vertically-extending rectangular-shaped indentation 120*c* configured to receive one of the square-shaped protrusions 104*g* of the coupling sleeve 104 (FIG. 8). Each threaded segment 120 also includes a ledge 120*d*. When the threaded segments 120 are positioned within the coupling sleeve 104 and the indentations 120*c* receive the protrusions 104*g*, the ledge 120*d* sits flush against the bottom of the ledge 104*b* of the coupling sleeve 104 (FIG. 8). Each threaded segment 120 also includes a plurality of threads 120*a* extending horizontally on a surface opposite the indentation 120*c*. The threads 120*a* are configured to receive and mate with an ordinance receptacle (not shown). In certain embodiments, the threaded segments 120 are MIL-DTL-38999 compliant threaded segments. One having ordinary skill in the art will recognize that any number of threaded segments 120 may be included in alternative embodiments of the invention.

Figure 10:
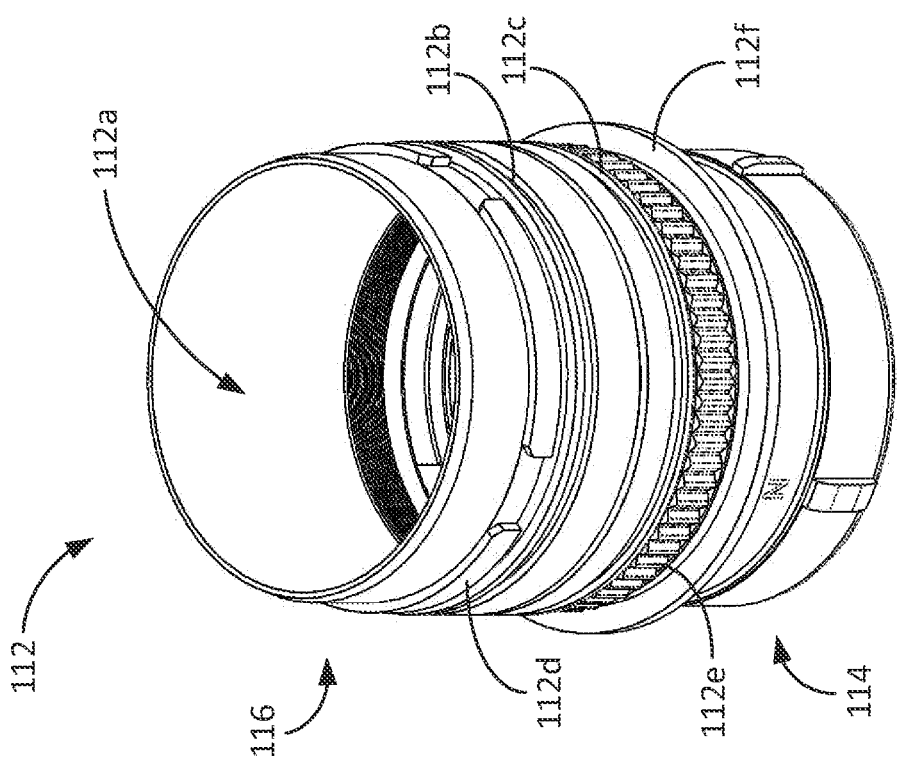
FIG. 10 is a top perspective view of plug housing, according to an exemplary embodiment.

FIG. 10 is a top perspective view of the plug housing 112 of two-piece housing 106, according to an exemplary embodiment. The plug housing 112 is cylindrical-shaped and includes a cavity 112*a*. The plug housing 112 includes a groove 112*b* configured to receive a portion of the rear connector cover retainer 134 (FIGS. 1B and 1C) therein. The plug housing 112 also includes a groove 112*c* (i.e., "first plug housing groove") positioned a distance below the groove 112*b* that is configured to receive a portion of the first latching spring 124 (FIGS. 2 and 3) therein and a groove 112*d* (i.e., "second plug housing groove") positioned a distance above the groove 112*b* that is configured to receive a portion of the second latching spring 138 (FIGS. 2 and 3) therein. The plug housing 112 also includes a plurality of teeth 112*e* extending vertically about a circumference of the plug housing 112. The teeth 112*e* are configured so as to mate with the radial bend 172 of the anti-rotation springs 124 (FIG. 7) and prevent the coupling sleeve 104 (FIG. 8) from unthreading itself. The plug housing 112 further includes a ledge 112*f* extending orthogonally outward that interfaces a bottom of the ledge 120*d* of each threaded segment 120 (FIG. 9) when assembled.

In certain embodiments, the plug housing 112 is a MIL-DTL-38999 compliant plug housing. The cavity 112*a* formed in the first portion 114 of the plug housing 112 is configured to receive a plug insert assembly 110 (FIGS. 1B-1C) therein. In certain embodiments, the plug insert assembly 110 is a MIL-DTL-38999 compliant insert assembly having 20 contacts and a shell size of 25, although any type or configuration of insert assembly may be used that can fit into the housing. One having ordinary skill in the art will recognize that a number of insert assemblies exist that may be utilized with the present invention.

Figure 11:
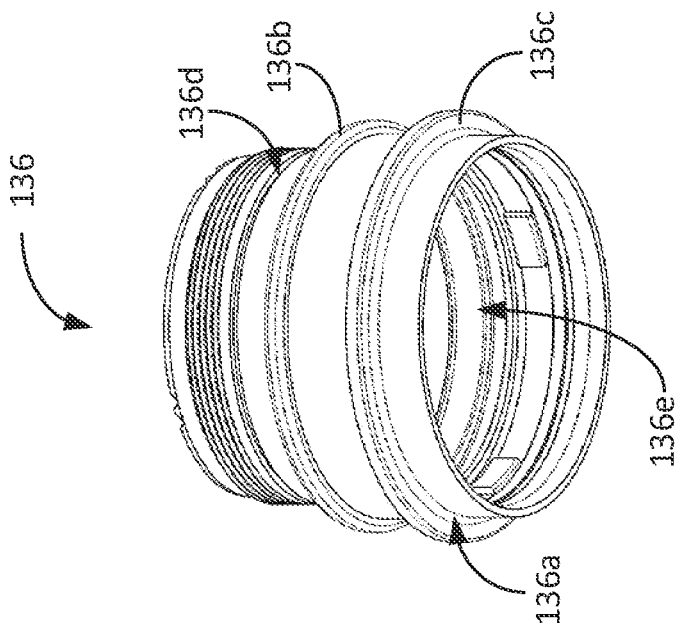
FIG. 11 is a perspective view of a secondary housing, according to an exemplary embodiment.

FIG. 11 is a top perspective view of the secondary housing 136 of two-piece housing 106, according to an exemplary embodiment. The secondary housing 136 is cylindrical-shaped and includes a cavity 136*e* within which plug housing 112 (FIG. 10) is received—with the secondary housing 136 being keyed to the plug housing 112 such that axial movement between the housings is permitted (during secondary actuation conditions) but rotational movement is prevented. The secondary housing 136 includes a groove 136*d* configured to receive a portion of the second lanyard ring retainer 144 (FIGS. 1B and 1C) therein to retain the position of the secondary housing 136 relative to the second lanyard ring 108. The secondary housing 136 also includes a groove 136*a* positioned a distance below the groove 136*d* that is configured to receive a portion of the second latching spring 138 (FIGS. 2 and 3) therein. The secondary housing 136 further includes a ledge 136*b* extending orthogonally outward that interfaces a bottom of the base 158 of the second lanyard ring 108 (FIG. 2B) when assembled and a ledge 136*c* that interfaces with intermediate sleeve (FIGS. 1B and 1C) when the second lanyard ring 108 is actuated.

Figures 12A, 12B:
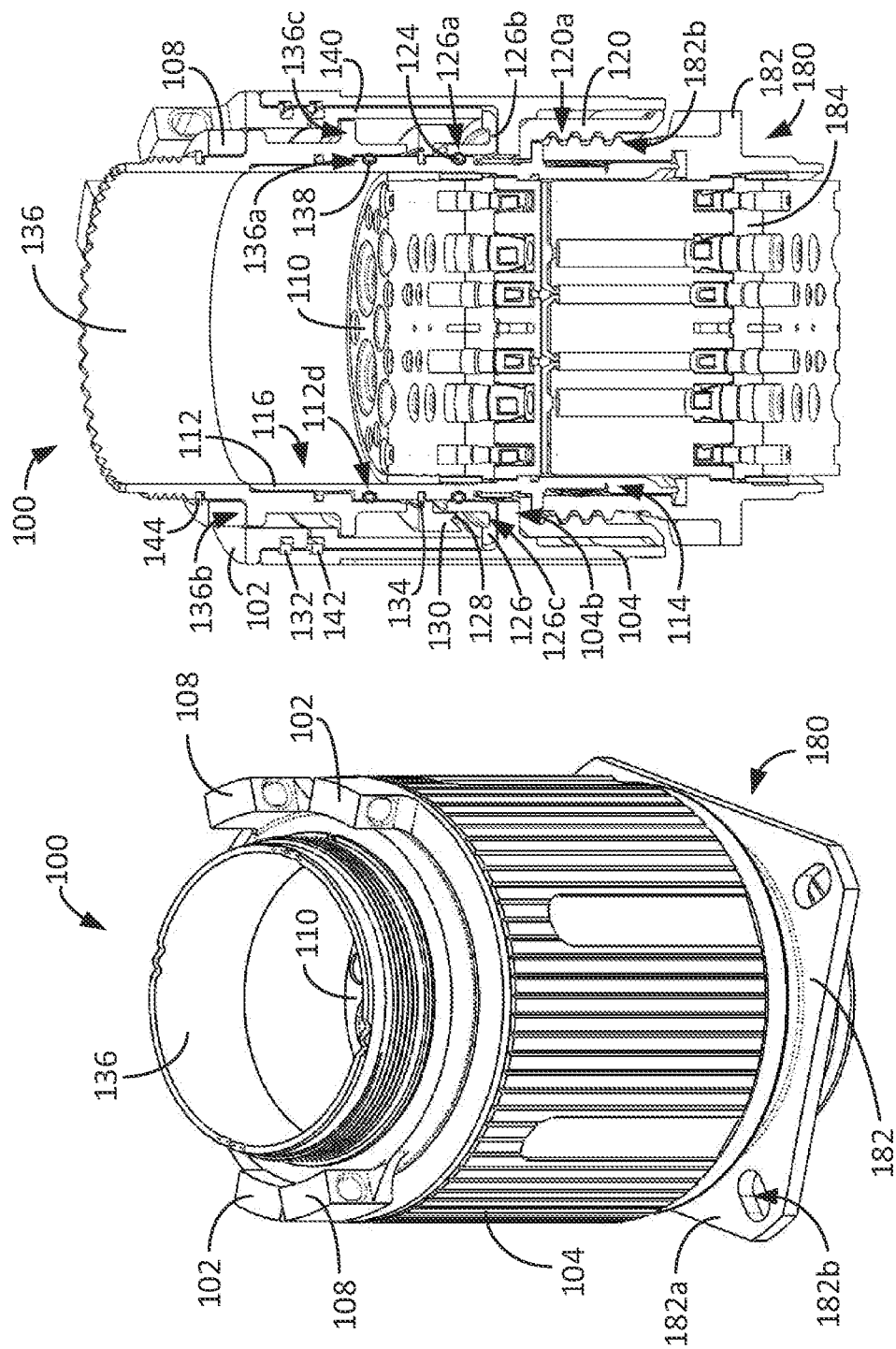
FIG. 12A is a perspective view of a lanyard connector and an ordinance receptacle, in a mated position, according to an exemplary embodiment.
FIG. 12B is a side cross-sectional view of the lanyard connector and ordinance receptacle shown in FIG. 12A, in the mated position, according to an exemplary embodiment.

FIG. 12A is a perspective view of the dual release dual release lanyard connector 100 coupled to an ordinance receptacle 180, according to an exemplary embodiment. The dual release lanyard connector 100 includes a circular first lanyard ring 102 coupled to a cylindrical sleeve 104 and a circular second lanyard ring 108 coupled to a secondary housing 136, with the cylindrical sleeve surrounding a cylindrical plug housing 112 and the secondary housing 136—which collectively form a two-piece articulated housing 106. The plug housing 112 includes a cavity 112a to receive a plug insert assembly 110 therein. The connector 100 also includes a circular rear connector cover 130 positioned between the lanyard rings 102 and the plug housing 112.

The ordinance receptacle 180 includes a receptacle housing 182 that houses a receptacle insert assembly (not shown). The ordinance receptacle 180 can include a flange 182a extending from the receptacle housing 182. The flange 182a includes opening 182b configured to receiving a fastener (not shown) for securing the ordinance receptacle 180 to a wall or stationary surface (not shown).

FIG. 12B is a side cross-sectional view of the dual release lanyard connector 100 and the ordinance receptacle 180 in the mated position, according to an exemplary embodiment. The dual release lanyard connector 100 includes a plug insert assembly 110 positioned within a first portion 114 of the plug housing 112. Six threaded segments 120 having a plurality of threads 120a surround the first portion of the plug housing 112 and the ordinance receptacle 180 via a plurality of threads 182b on the receptacle housing 182. The sleeve 104 surrounds the plug housing 112 and the threaded segments 120 and prevents the threaded segments 120 from expanding outward and releasing the ordinance receptacle 180.

The dual release lanyard connector 100 also includes a first canted coil latching spring 124 disposed partially within a groove 112b on the plug housing 112. The first latching spring 124 also interfaces with a groove 126a on a locking ring 126. The locking ring 126 includes a flange 126b in contact with a protrusion 104b extending from the interior of the sleeve 104.

The dual release lanyard connector 100 also includes a reset spring 128 positioned below the rear connector cover 130 and at least partially within a groove 126c of the locking ring 126. The rear connector cover 130 holds the reset spring 128 in place.

The dual release lanyard connector 100 further includes a first circular lanyard ring retainer 132. The lanyard ring retainer 132 holds the first lanyard ring 102 to the sleeve 104 and allows the sleeve 104 to rotate. The connector 100 also includes a circular rear connector cover retainer 134. The rear connector cover retainer 134 is positioned around the plug housing 112 and above the rear connector cover 130. The rear connector cover retainer 134 forces the rear connector cover 130 towards the reset spring 128, which ultimately holds the connector 100 together.

The ordinance receptacle 180 includes a receptacle insert assembly 184 positioned inside the receptacle housing 182. The receptacle insert assembly 184 is configured to mate with the plug insert assembly 110 via contact pins (not shown) when the dual release lanyard connector 100 is coupled to the ordinance receptacle 180.

The secondary housing 136 is positioned within coupling sleeve 104 in a manner such that a rear end of the secondary housing 136 extends out from the coupling sleeve 104. The secondary housing 136 is positioned about the second portion 116 of plug housing 112, with the secondary housing 136 thus being contained/positioned between the second portion 116 of plug housing 112 and coupling sleeve 104. The secondary housing 136 includes a flange 136b in contact with the second lanyard ring 108 and a flange 136c in contact with an intermediate sleeve 140 of dual release lanyard connector 100 that is positioned between the coupling sleeve 104 and the secondary housing 136. A retainer ring 142 is provided in dual release lanyard connector 100 that couples the intermediate sleeve 140 to the coupling sleeve 104 and allows the coupling sleeve 104 to rotate about the intermediate sleeve 140.

The dual release lanyard connector 100 also includes a second circular canted coil latching spring 138 that interfaces with a groove 136a on the secondary housing 136. The second latching spring 138 also is disposed at least partially within a groove 112d (i.e., "second plug housing groove") on the plug housing 112.

The dual release lanyard connector 100 further includes a circular second lanyard ring retainer 144. The second lanyard ring retainer 144 holds the second lanyard ring 108 to the secondary housing 136 and allows the second lanyard ring 108 to rotate about the secondary housing 136.

Figures 12C, 12D:
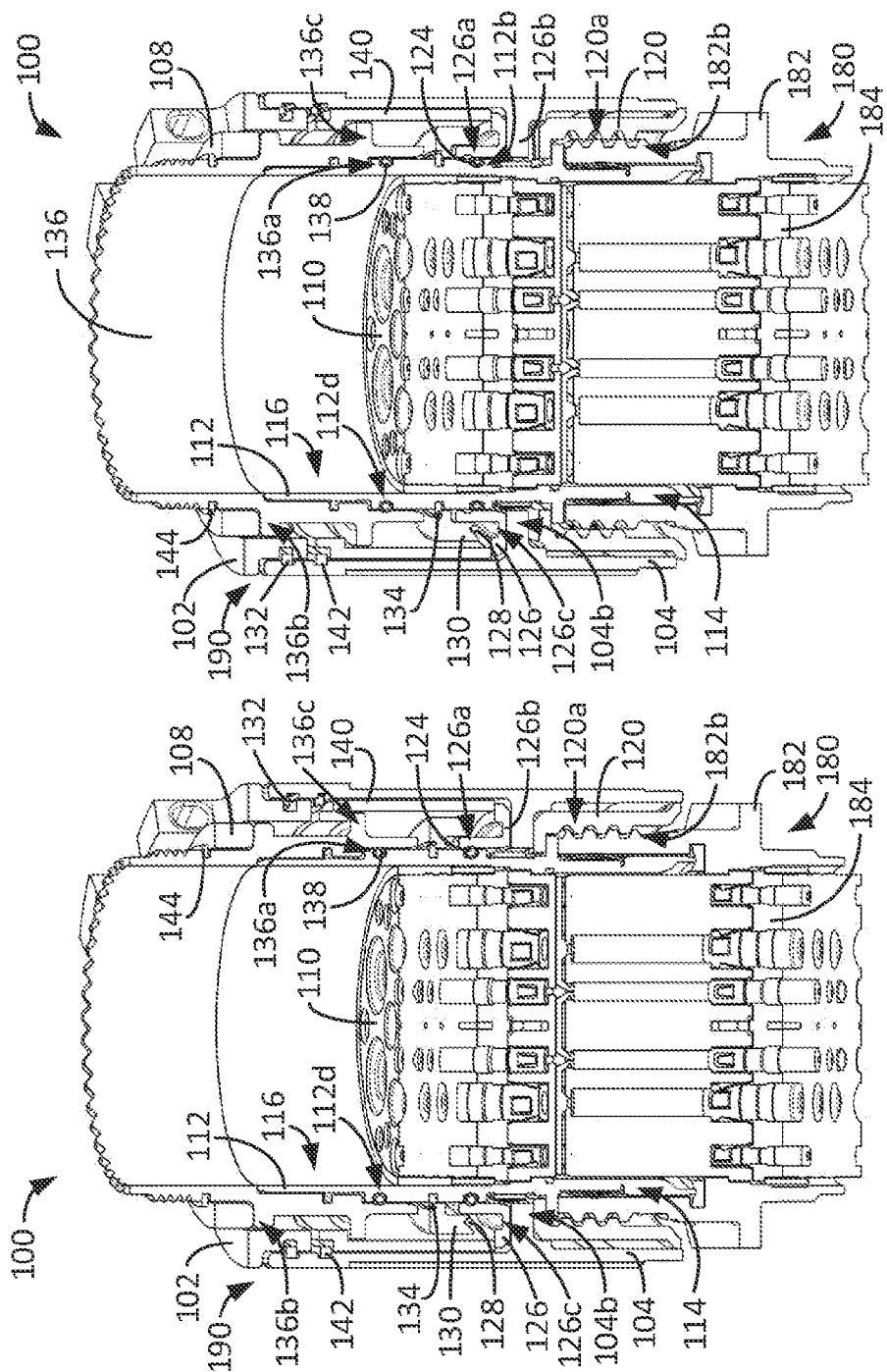

FIGS. 12C-12E illustrate an actuation of the connector 100 and accompanying release of the ordinance receptacle 180 achieved via an actuation of elements along a primary release path. FIG. 12C is a side cross-sectional view of the dual release lanyard connector 100 and ordinance receptacle 180 in a first actuated position, according to an exemplary embodiment. The first lanyard ring 102 is shifted upward (from a "first position" to a "second position") by pulling on a first lanyard cable (not shown) coupled to openings 154 on the first lanyard ring 102. The first lanyard ring 102 is coupled to the sleeve 104 by the lanyard ring retainer 132—with the first lanyard ring 102 and lanyard ring retainer 132 forming a primary (or first) lanyard subassembly 190. Upon actuation of the first lanyard ring 102, the sleeve 104 shifts upward (also from the "first position" to the "second position"). As the sleeve 104 shifts, the locking ring 126 is also forced upwards by the flange 126b resting on the protrusion 104b of the sleeve 104. As a result, the first latching spring 124 is then compressed and fully disposed with the groove 112b on the plug housing 112. Upon actuation, the reset spring 128 also starts compressing between the groove 126c of the locking ring 126 and the rear connector cover 130. As the sleeve 104 shifts upward, the threaded segments 120 begin moving outward and start disengaging from the threads 182b on the receptacle housing 182.

The above described arrangement and actuation of elements describes the primary release path in the dual release lanyard connector 100, with movement/actuation of the dual release lanyard connector 100 and ordinance receptacle 180 to the first actuated positioned being effectuated via pulling on a first lanyard cable attached to the primary lanyard subassembly 190.

FIG. 12D is a side cross-sectional view of the dual release lanyard connector 100 and ordinance receptacle 180 in a released position, as would occur after the dual release lanyard connector 100 and ordinance receptacle 180 are caused to be actuated to the first actuated position, according to an exemplary embodiment. The coupling sleeve 104 and the locking ring 126 shift upward together until the locking ring 126 abuts a surface 130a of the rear cover 130. In the released position, the reset spring 128 is fully compressed between the groove 126c of the locking ring 126 and the rear connector cover 130. The threaded segments 120 are substantially separated from one another and rest against an interior 104c of the sleeve 104. Upon separation of the six threaded segments 120 from each other, the threads 120a disengage with the corresponding threads 182b on the receptacle housing 182, and allow disconnection of the plug insert assembly 110 from the receptacle insert assembly 184.

FIG. 12E is a side cross-sectional view of the dual release lanyard connector 100 and ordinance receptacle 180 in a cleared position, according to an exemplary embodiment. As the threads 182b of the receptacle housing 182 fully disengage from the threaded segments 120, and the plug insert assembly 110 is fully cleared of the receptacle insert assembly 184, ordinance receptacle 180 is separated and released from the dual release lanyard connector 100. The reset spring 128 then pushes against the sliding force of the latching spring 124 against the locking ring 126 and forces the sleeve 104 towards the mated position described with respect to FIG. 12B. The sleeve 104 moves downward and shifts the threaded segments 120 inward to their initial mated position, as described with respect to FIG. 12B.

Figures 12G, 12H:
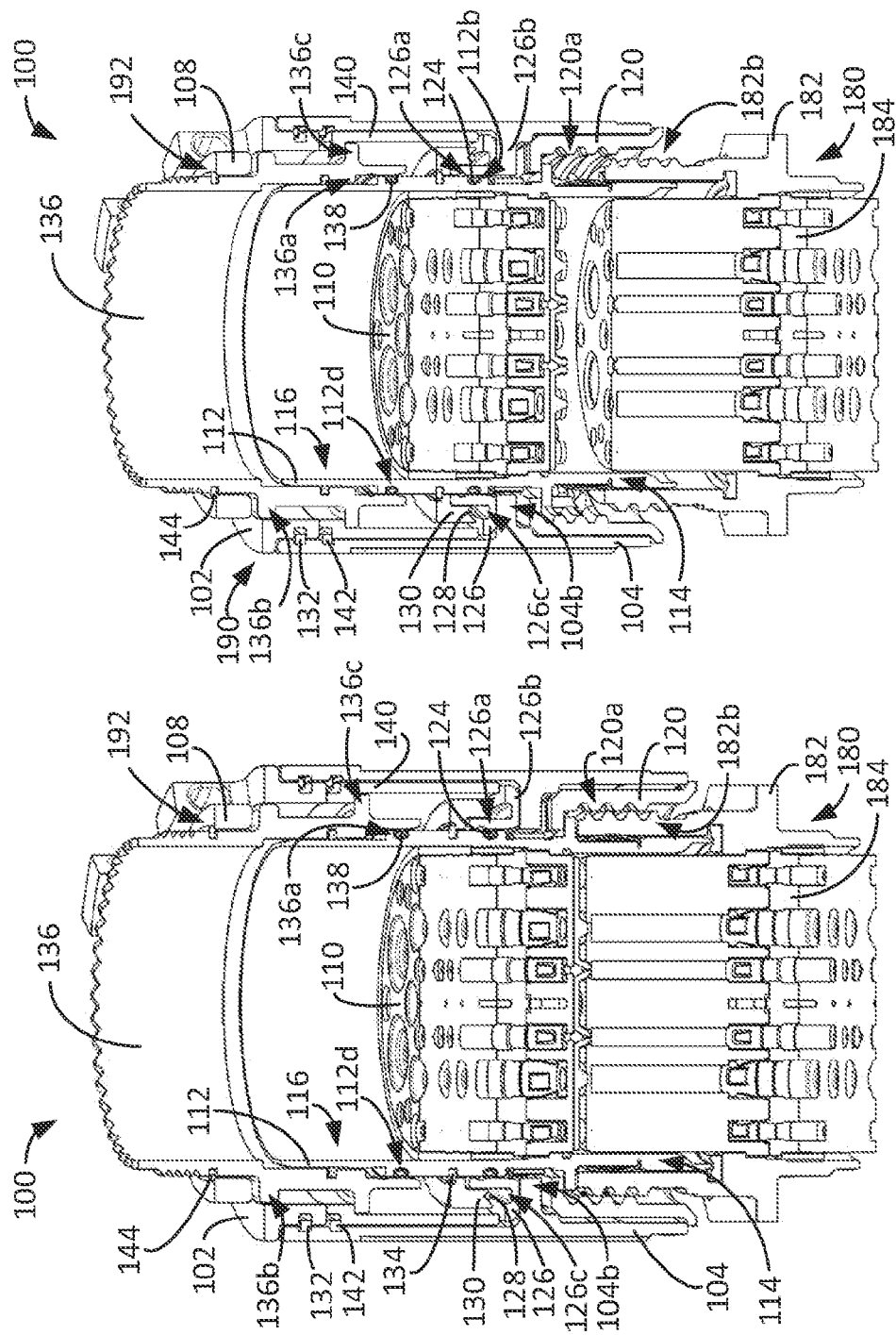

FIGS. 12F-12H illustrate an actuation of the connector 100 and accompanying release of the ordinance receptacle 180 achieved via an actuation of elements along a secondary release path. FIG. 12F is a side cross-sectional view of the dual release lanyard connector 100 and ordinance receptacle 180 in a second actuated position, according to an exemplary embodiment. It is recognized that it may be necessary to cause actuation of the dual release lanyard connector 100 to the second actuated position if an attempt to actuate the dual release lanyard connector 100 and ordinance receptacle 180 to the first actuated position proves to be unsuccessful, such as might occur due to failure of one or more components in the dual release lanyard connector 100. For example, a malfunction/failure of the primary lanyard subassembly 190 (i.e., of first lanyard connector 102 or lanyard ring retainer 132) may result in a failure to shift the coupling sleeve 104 upward and thus prevent movement of the connector 100 to the first actuated position.

In FIG. 12F, the second lanyard ring 108 is shifted upward (from a "third position" to a "fourth position") by pulling on a second lanyard cable (not shown) coupled to openings 162 on the second lanyard ring 108. The second lanyard ring 108 is coupled to the secondary housing 136 by the lanyard ring retainer 144—with the second lanyard ring 108 and lanyard ring retainer 144 forming a secondary (or second) lanyard subassembly 192. Upon actuation of the second lanyard ring 108, the secondary housing 136 shifts upward (also from the "third position" to the "fourth position"). As the secondary housing 136 shifts, the coupling sleeve 104 is also forced upwards based on an interaction between the flange 136c of secondary housing 136 and intermediate sleeve 140 and the interaction between intermediate sleeve 140 and coupling sleeve 104. As a result, the second latching spring 138 is then compressed and fully disposed with the groove 112d on the plug housing 112.

Responsive to the coupling sleeve 104 being forced and shifting upwards via its interaction with the secondary housing 136 and intermediate sleeve 140, the locking ring 126 is also forced upwards by the flange 126b resting on the protrusion 104b of the sleeve 104. As a result, the first latching spring 124 is then compressed and fully disposed with the groove 112b on the plug housing 112. Upon actuation, the reset spring 128 also starts compressing between the groove 126c of the locking ring 126 and the rear connector cover 130. As the sleeve 104 shifts upward, the threaded segments 120 begin moving outward and start disengaging from the threads 182b on the receptacle housing 182.

The above described arrangement and actuation of elements describes the secondary release path in the dual release lanyard connector 100. As can be seen, the secondary release path bypasses the primary lanyard subassembly 190 of the primary release path via inclusion of the secondary lanyard subassembly 192 and the secondary housing 136, with the secondary release path only having a commonality with the primary release path upon reaching the coupling sleeve 104 (and its interaction/actuation with locking ring 126).

FIG. 12G is a side cross-sectional view of the dual release lanyard connector 100 and ordinance receptacle 180 in a released position, as would occur after the dual release lanyard connector 100 and ordinance receptacle 180 are caused to be actuated to the second actuated position, according to an exemplary embodiment. The coupling sleeve 104 and the locking ring 126 shift upward together until the locking ring 126 abuts a surface 130a of the rear cover 130. In the released position, the reset spring 128 is fully compressed between the groove 126c of the locking ring 126 and the rear connector cover 130. The threaded segments 120 are substantially separated from one another and rest against an interior 104c of the sleeve 104. Upon separation of the six threaded segments 120 from each other, the threads 120a disengage with the corresponding threads 182b on the receptacle housing 182, and allow disconnection of the plug insert assembly 110 from the receptacle insert assembly 184.

FIG. 12H is a side cross-sectional view of the dual release lanyard connector 100 and ordinance receptacle 180 in a cleared position, according to an exemplary embodiment. As the threads 182b of the receptacle housing 182 fully disengage from the threaded segments 120, and the plug insert assembly 110 is fully cleared of the receptacle insert assembly 184, ordinance receptacle 180 is separated and released from the dual release lanyard connector 100. The reset spring 128 then pushes against the sliding force of the latching spring 124 against the locking ring 126 and forces the sleeve 104 towards the mated position described with respect to FIG. 12B. The sleeve 104 moves downward and shifts the threaded segments 120 inward to their initial mated position, as described with respect to FIG. 12B.

Figure 12J:
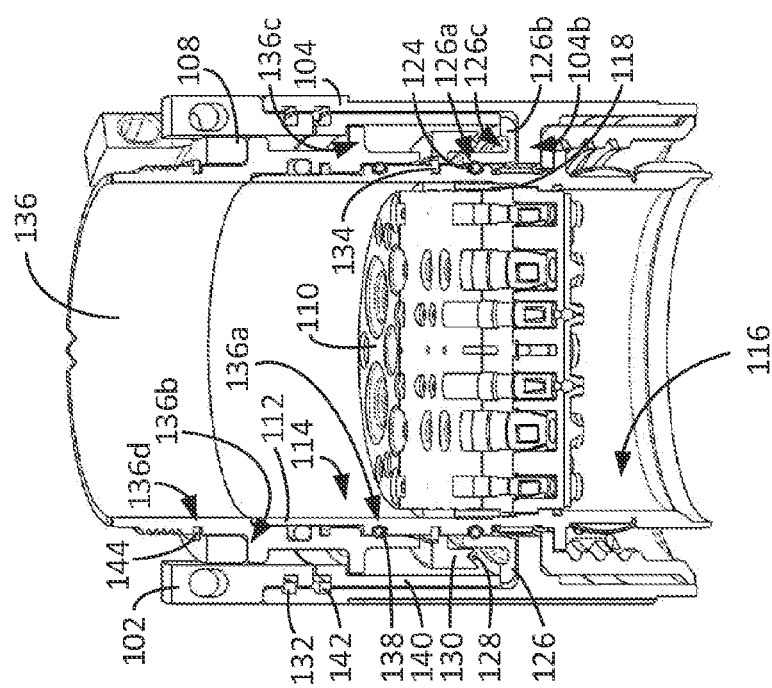
FIG. 12J is a side cross-sectional view of the lanyard connector and ordinance receptacle shown in FIG. 12A, in a reset position, according to an exemplary embodiment.

FIG. 12J is a side cross-sectional view of the dual release lanyard connector 100 and ordinance receptacle 180, in a reset position after the ordinance receptacle 180 has been released and cleared, according to an exemplary embodiment. The reset spring 128 has forced the coupling sleeve 104 to the mated position described with respect to FIG. 12B, by pushing down on the locking ring 126 via groove 126c. As a result, the remaining components shift to their respective mated positions, as described with respect to FIG. 12B. The dual release lanyard connector 100 can now be coupled to a receptacle 196 for ordinance release.

Figure 13:
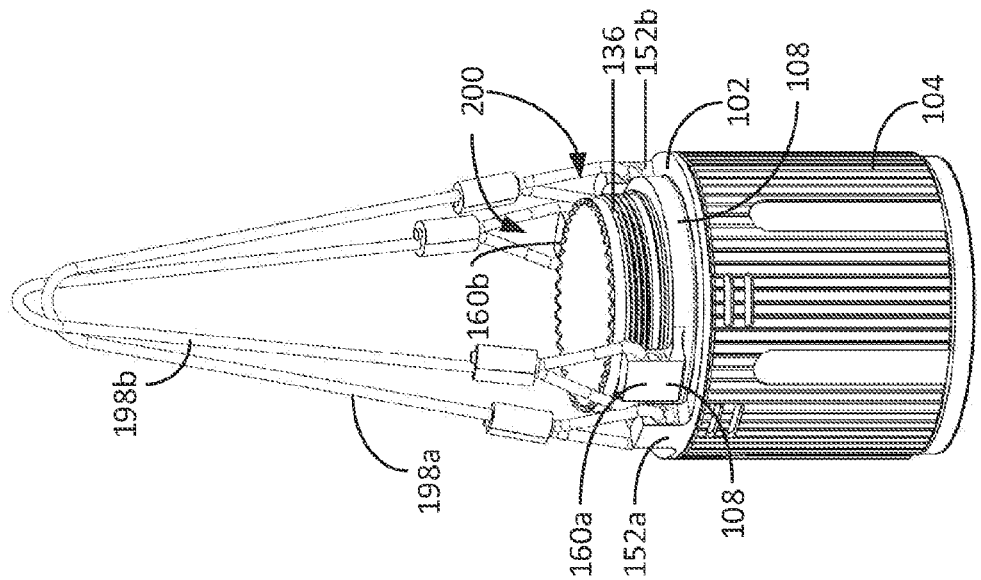
FIG. 13 is a perspective view of a lanyard connector coupled to a lanyard cable, according to an exemplary embodiment.

FIG. 13 is a perspective view of the dual release lanyard connector 100 coupled to first and second lanyard cables 198a, 198b, according to an exemplary embodiment. The lanyard cables 198a, 198b may be coupled to a bail bar (not shown) via a loop 200 in each lanyard cable 198a, 198b. The first lanyard cable 198a is coupled to a first protrusion 152a and a second protrusion 152b of the first lanyard ring 102, while the second lanyard cable 198b is coupled to a first protrusion 160a and a second protrusion 160b of the second lanyard ring 108. The first lanyard ring 102 is coupled to the coupling sleeve 104 while the second lanyard ring 108 is coupled to the secondary housing 136. The dual release lanyard connector 100 is coupled to an ordinance (not shown) to be released.

To release the ordinance, the ordinance pulls on the connector 100 downward. The lanyard cables 198a, 198b coupled to the bail bar prevent release of the dual release lanyard connector 100, and the connector 100 is actuated by pulling the first lanyard cable 198a so as to shift the first lanyard ring 102 of primary lanyard subassembly 190 upwards. As described with respect to FIGS. 11C-11E, shifting the first lanyard ring 102, as well as the coupling sleeve 104, upwards allows for the threaded segments (not shown) to separate more from one another. The increase in separation of the threaded segments from one another allows for disengagement of an ordinance receptacle (not shown) from the dual release lanyard connector 100. After release of the ordinance receptacle, another ordinance receptacle (not shown) can then be coupled to the dual release lanyard connector 100 by mating the receptacle with the threaded segments in the connector 100 via corresponding threads on the receptacle and threaded segments.

In the event of a failure of the primary lanyard subassembly 190, the second lanyard cable 198*b* may be pulled so as to shift the second lanyard ring 108 upwards to actuate the connector 100. As described with respect to FIGS. 11F-11H, shifting the second lanyard ring 102, as well as the secondary housing 136 and coupling sleeve 104, upwards allows for the threaded segments (not shown) to separate more from one another. The increase in separation of the threaded segments from one another allows for disengagement of an ordinance receptacle (not shown) from the dual release lanyard connector 100. After release of the ordinance receptacle, another ordinance receptacle (not shown) can then be coupled to the dual release lanyard connector 100 by mating the receptacle with the threaded segments in the connector 100 via corresponding threads on the receptacle and threaded segments.

Generally, the components of the dual release lanyard connectors of the present invention may be fabricated from material suitable per military specifications. Suitable materials include, but are not limited to, aerospace-grade aluminum alloys, corrosion-resistant or stainless steel, and engineering-grade plastics. The dual release lanyard connectors of the present invention are capable of handling the forces associated with the release of an ordinance without damaging the aircraft carrying the ordinance or the connectors themselves. The inclusion of a latching spring and a locking ring in the connectors decreases the forces necessary for the reset spring to move the components into their original mated positions. As a result, the likelihood of ratcheting occurring upon release of the ordinance receptacle is minimized.

Any spatial references herein, such as, for example, "top," "bottom," "upper," "lower," "above", "below," "rear," "between," "vertical," "angular," "beneath," etc., are for purpose of illustration only and do not limit the specific orientation or location of the described structure.

Beneficially, embodiments of the invention thus provide a dual release lanyard connector that can withstand aircraft ordinance release, without easily being damaged. The dual release lanyard connector also provides redundant separation capability for ordinance release along partially separated primary and secondary release paths during actuation, such that if a failure occurs in the primary lanyard subassembly, the secondary lanyard subassembly may be used to actuate the connector. The dual release lanyard connector further provides reset and multiple testing capabilities.

Therefore, according to one embodiment of the present invention, a dual release lanyard connector coupleable to an ordinance receptacle includes a first lanyard ring coupleable to a first lanyard cable, a second lanyard ring coupleable to a second lanyard cable, a coupling sleeve coupled to the first lanyard ring and movable between a first position and a second position, and a locking ring configured to engage the coupling sleeve and movable between the first position and the second position, the locking ring having a first ring groove. The dual release lanyard connector also includes a two-piece housing comprising a plug housing having a first plug housing groove and a second plug housing groove and a secondary housing coupled to the second lanyard ring and having a secondary housing groove, the secondary housing movable between a third position and a fourth position. The dual release lanyard connector further includes a first latching spring that is partially disposed within the first ring groove and partially disposed within the first plug housing groove at the first position, and wherein the first latching spring disengages the first ring groove and is fully disposed within the first plug housing groove at the second position. The dual release lanyard connector still further includes a second latching spring that is partially disposed within the second plug housing groove and partially disposed within the secondary housing groove at the third position, and wherein the second latching spring disengages the secondary housing groove and is fully disposed within the second plug housing groove at the fourth position. The secondary housing is configured to engage the coupling sleeve such that movement of the secondary housing to the fourth position causes a corresponding movement of the coupling sleeve and locking ring to the second position.

According to another embodiment of the present invention, a dual release lanyard connector coupleable to an ordinance receptacle includes a primary lanyard connector subassembly connectable to a first lanyard cable and movable between a first position and a second position to provide a first release path for releasing the ordinance receptacle from the dual release lanyard connector, with the dual release lanyard connector retaining the ordinance receptacle when the primary lanyard connector subassembly is in the first position and releasing the ordinance receptacle when the primary lanyard connector subassembly is in the second position. The dual release lanyard connector also includes a secondary lanyard connector subassembly connectable to a second lanyard cable and movable between a third position and a fourth position to provide a second release path for releasing the ordinance receptacle from the dual release lanyard connector, with the dual release lanyard connector retaining the ordinance receptacle when the secondary lanyard connector subassembly is in the third position and releasing the ordinance receptacle when the secondary lanyard connector subassembly is in the fourth position. The dual release lanyard connector further includes a reset spring configured to reset the primary lanyard connector subassembly from the second position to the first position and reset the secondary lanyard connector subassembly from the fourth position to the third position.

According to yet another embodiment of the present invention, a method of releasing an ordinance receptacle coupled to a dual release lanyard connecter includes coupling the receptacle to the dual release lanyard connector, pulling on a first lanyard cable to actuate a primary lanyard connector subassembly from a first position to a second position so as to cause the receptacle to be released from the dual release lanyard connector, and, when a failure occurs preventing releasing of the receptacle from the dual release lanyard connector upon pulling on the first lanyard cable, then pulling on a second lanyard cable to actuate a secondary lanyard connector subassembly from a third position to a fourth position, so as to cause the receptacle to be released from the dual release lanyard connector. The method also includes resetting the primary lanyard connector subassembly from the second position to the first position and the secondary lanyard connector subassembly from the third position to the fourth position. Actuating the primary lanyard connector subassembly includes actuating a first lanyard ring of the dual release lanyard connector from the first position to the second position, with actuation of the first lanyard ring causing a coupling sleeve and a locking ring of the dual release lanyard connector to also move from the first position to the second position, such that a first latching spring of the dual release lanyard connector disengages a first ring groove of the locking ring and a reset spring of the dual release lanyard connector is compressed. Actuating the secondary lanyard connector subassembly includes actuating a second lanyard ring of the dual release lanyard connector from the third position to the fourth position, with actuation of the second lanyard ring causing a secondary housing of the dual release lanyard connector to also move from the third position to the fourth position such that a second latching spring of the dual release lanyard connector disengages a groove of the secondary housing, with movement of the secondary housing to the fourth position causing the coupling sleeve and the locking ring to move from the first position to the second position and the reset spring to be compressed.

The present invention has been described in terms of the preferred embodiment, and it is recognized that equivalents, alternatives, and modifications, aside from those expressly stated, are possible and within the scope of the appending claims.

What is claimed is:

1. A dual release lanyard connector coupleable to an ordinance receptacle, the dual release lanyard connector comprising:
    a first lanyard ring coupleable to a first lanyard cable;
    a second lanyard ring coupleable to a second lanyard cable;
    a coupling sleeve coupled to the first lanyard ring and movable between a first position and a second position;
    a locking ring configured to engage the coupling sleeve and movable between the first position and the second position, the locking ring having a first ring groove;
    a two-piece housing comprising:
        a plug housing having a first plug housing groove and a second plug housing groove; and
        a secondary housing coupled to the second lanyard ring and having a secondary housing groove, the secondary housing movable between a third position and a fourth position;
    a first latching spring that is partially disposed within the first ring groove and partially disposed within the first plug housing groove at the first position, and wherein the first latching spring disengages the first ring groove and is fully disposed within the first plug housing groove at the second position; and
    a second latching spring that is partially disposed within the second plug housing groove and partially disposed within the secondary housing groove at the third position, and wherein the second latching spring disengages the secondary housing groove and is fully disposed within the second plug housing groove at the fourth position;
    wherein the secondary housing is configured to engage the coupling sleeve such that movement of the secondary housing to the fourth position causes a corresponding movement of the coupling sleeve and locking ring to the second position.

2. The dual release lanyard connector of claim 1, wherein the locking ring has a second ring groove; and
    wherein the dual release lanyard connector further comprises:
        a rear connector cover positioned proximate the locking ring; and
        a reset spring held in place by the rear connector cover, wherein a portion of the reset spring is disposed within the second ring groove.

3. The dual release lanyard connector of claim 2, further comprising a rear connector cover retainer, wherein the rear connector cover retainer forces the rear connector cover towards the reset spring.

4. The dual release lanyard connector of claim 1, further comprising:
    a first retainer ring that couples the first lanyard ring to the coupling sleeve; and
    a second retainer ring that couples the second lanyard ring to the secondary housing.

5. The dual release lanyard connector of claim 1, further comprising an intermediate sleeve positioned between the coupling sleeve and the secondary housing to provide for engagement therebetween, wherein a flange of the secondary housing is configured to engage the intermediate sleeve so as to cause the intermediate sleeve to engage the coupling sleeve.

6. The dual release lanyard connector of claim 5, further comprising a third retainer ring that couples the intermediate sleeve to the coupling sleeve.

7. The dual release lanyard connector of claim 1, further comprising a plurality of anti-rotation mechanisms, the plurality of anti-rotation mechanisms being positioned within a plurality of grooves formed in the coupling sleeve.

8. The dual release lanyard connector of claim 1, further comprising a plurality of threaded segments in communication with the coupling sleeve, wherein adjacent threaded segments are partially separated in the first position, and wherein the threaded segments are more separated in the second position.

9. The dual release lanyard connector of claim 1, wherein the plug housing is coupled to the locking ring by a plug housing cover retainer.

10. The dual release lanyard connector of claim 1, further comprising a plug insert assembly positioned within the plug housing.

11. The dual release lanyard connector of claim 1, wherein the reset spring is a sinusoidal type spring and the latching spring is a canted coil type spring.

12. The dual release lanyard connector of claim 1, wherein the first lanyard ring and the second lanyard ring provide primary and secondary release paths for the dual release lanyard connector, the primary and secondary release paths sharing the coupling sleeve, the locking ring and the first latching spring as common elements.

13. A dual release lanyard connector coupleable to an ordinance receptacle, the dual release lanyard connector comprising:
    a primary lanyard connector subassembly connectable to a first lanyard cable and movable between a first position and a second position to provide a first release path for releasing the ordinance receptacle from the dual release lanyard connector, the dual release lanyard connector retaining the ordinance receptacle when the primary lanyard connector subassembly is in the first position and releasing the ordinance receptacle when the primary lanyard connector subassembly is in the second position;
    a secondary lanyard connector subassembly connectable to a second lanyard cable and movable between a third position and a fourth position to provide a second release path for releasing the ordinance receptacle from the dual release lanyard connector, the dual release lanyard connector retaining the ordinance receptacle when the secondary lanyard connector subassembly is in the third position and releasing the ordinance receptacle when the secondary lanyard connector subassembly is in the fourth position; and a reset spring configured to reset the primary lanyard connector subassembly from the second position to the first position and reset the secondary lanyard connector subassembly from the fourth position to the third position.

14. The lanyard connector of claim 13, further comprising:
a coupling sleeve movable between the first position and the second position;
a locking ring configured to engage the coupling sleeve and movable between the first position and the second position, the locking ring having a first ring groove and a second ring groove;
a first latching spring, wherein the first latching spring is partially disposed within the first ring groove at the first position, and wherein the latching spring disengages the first ring groove at the second position; and
a rear connector cover positioned proximate the locking ring, wherein the reset spring is held in place by the rear connector cover, with a portion of the reset spring being disposed within the second ring groove.

15. The lanyard connector of claim 14, wherein the primary lanyard connector subassembly comprises:
a first lanyard ring connectable to the first lanyard cable; and
a first retainer ring that couples the first lanyard ring to the coupling sleeve, such that actuation of the first lanyard ring causes movement of the coupling sleeve and locking ring from the first position to the second position.

16. The lanyard connector of claim 14, further comprising:
a two-piece housing that includes:
a plug housing having a first plug housing groove and a second plug housing groove, the first latching spring being partially disposed within the first plug housing groove at the first position, and wherein the first latching spring is fully disposed within the first plug housing groove at the second position; and
a secondary housing positioned adjacent the plug housing, the secondary housing having a secondary housing groove and being movable between the third position and the fourth position; and
a second latching spring that is partially disposed within the second plug housing groove and partially disposed within the secondary housing groove at the third position, and wherein the second latching spring disengages the secondary housing groove and is fully disposed within the second plug housing groove at the fourth position.

17. The lanyard connector of claim 16, wherein the secondary lanyard connector subassembly comprises:
a second lanyard ring connectable to the second lanyard cable; and
a second retainer ring that couples the second lanyard ring to the secondary housing, such that actuation of the second lanyard ring causes movement of the secondary housing from the third position to the fourth position.

18. The dual release lanyard connector of claim 16, wherein the secondary housing is configured to engage the coupling sleeve such that movement of the secondary housing to the fourth position causes a corresponding movement of the coupling sleeve and locking ring to the second position.

19. The dual release lanyard connector of claim 18, further comprising an intermediate sleeve positioned between the coupling sleeve and the secondary housing to provide for engagement therebetween, wherein a flange of the secondary housing is configured to engage the intermediate sleeve so as to cause the intermediate sleeve to engage the coupling sleeve.

20. A method of releasing an ordinance receptacle coupled to a dual release lanyard connecter, the method comprising:
coupling the receptacle to the dual release lanyard connector;
pulling on a first lanyard cable to actuate a primary lanyard connector subassembly from a first position to a second position, so as to cause the receptacle to be released from the dual release lanyard connector;
when a failure occurs preventing releasing of the receptacle from the dual release lanyard connector upon pulling on the first lanyard cable, then pulling on a second lanyard cable to actuate a secondary lanyard connector subassembly from a third position to a fourth position, so as to cause the receptacle to be released from the dual release lanyard connector; and
resetting the primary lanyard connector subassembly from the second position to the first position and the secondary lanyard connector subassembly from the third position to the fourth position;
wherein actuating the primary lanyard connector subassembly comprises actuating a first lanyard ring of the dual release lanyard connector from the first position to the second position, with actuation of the first lanyard ring causing a coupling sleeve and a locking ring of the dual release lanyard connector to also move from the first position to the second position, such that a first latching spring of the dual release lanyard connector disengages a first ring groove of the locking ring and a reset spring of the dual release lanyard connector is compressed;
wherein actuating the secondary lanyard connector subassembly comprises actuating a second lanyard ring of the dual release lanyard connector from the third position to the fourth position, with actuation of the second lanyard ring causing a secondary housing of the dual release lanyard connector to also move from the third position to the fourth position such that a second latching spring of the dual release lanyard connector disengages a groove of the secondary housing, with movement of the secondary housing to the fourth position causing the coupling sleeve and the locking ring to move from the first position to the second position and the reset spring to be compressed.

* * * * *